United States Patent
Crooks

(10) Patent No.: US 8,199,004 B1
(45) Date of Patent: Jun. 12, 2012

(54) RFID TAG READER

(75) Inventor: John F. Crooks, Duluth, GA (US)

(73) Assignee: NCR Corporation, Duluth, GA (US)

( * ) Notice: Subject to any disclaimer, the term of this patent is extended or adjusted under 35 U.S.C. 154(b) by 1025 days.

(21) Appl. No.: 11/536,737

(22) Filed: Sep. 29, 2006

(51) Int. Cl.
*G08B 1/08* (2006.01)

(52) U.S. Cl. ............. 340/539.3; 340/13.26; 340/539.11; 340/539.21; 340/10.1

(58) Field of Classification Search .................. 340/10.3, 340/10.1, 10.2, 10.4, 7.37, 10.5, 572.1, 13.26, 340/539.11, 539.3, 539.21; 235/435, 449, 235/450, 451, 375, 376, 377, 378, 379, 380, 235/381, 382, 384, 385; 713/300, 340; 455/522, 455/127.1, 298, 343.1, 343.5, 574

See application file for complete search history.

(56) References Cited

U.S. PATENT DOCUMENTS

| | | | | |
|---|---|---|---|---|
| 4,785,166 A * | 11/1988 | Kushima | ....................... | 235/441 |
| 5,218,191 A * | 6/1993 | Chadima et al. | ......... | 235/462.16 |
| 5,235,326 A * | 8/1993 | Beigel et al. | ............... | 340/10.41 |
| 5,682,032 A * | 10/1997 | Philipp | ......................... | 235/422 |
| 5,892,441 A * | 4/1999 | Woolley et al. | .......... | 340/539.26 |
| 5,966,404 A * | 10/1999 | Yokota et al. | .................. | 375/219 |
| 6,097,301 A * | 8/2000 | Tuttle | ......................... | 340/693.9 |
| 6,150,948 A * | 11/2000 | Watkins | ..................... | 340/693.3 |
| 6,158,656 A * | 12/2000 | Matsumoto et al. | .......... | 235/380 |
| 6,223,025 B1 * | 4/2001 | Tsukuda | ...................... | 340/7.37 |
| 6,275,715 B1 * | 8/2001 | Motohashi | ..................... | 455/574 |
| 6,314,307 B1 * | 11/2001 | Charron | ........................ | 455/573 |
| 6,476,708 B1 * | 11/2002 | Johnson | ..................... | 340/10.34 |
| 6,681,336 B1 * | 1/2004 | Nakazato et al. | ............. | 713/322 |
| 6,727,816 B1 * | 4/2004 | Helgeson | ....................... | 340/540 |
| 6,745,027 B2 * | 6/2004 | Twitchell, Jr. | ............. | 455/422.1 |
| 6,882,274 B2 * | 4/2005 | Richardson et al. | ...... | 340/539.13 |
| 7,053,777 B2 * | 5/2006 | Allen | .......................... | 340/572.1 |
| 7,057,514 B2 * | 6/2006 | Mickle et al. | ............... | 340/572.7 |
| 7,180,403 B2 * | 2/2007 | Quan | ........................... | 340/10.3 |
| 7,197,279 B2 * | 3/2007 | Bellantoni | .................... | 455/41.2 |
| 7,233,247 B1 * | 6/2007 | Crossno et al. | ............. | 340/572.1 |
| 7,237,719 B2 * | 7/2007 | Fruhauf | ........................ | 235/451 |
| 7,374,096 B2 * | 5/2008 | Overhultz et al. | ............. | 235/487 |
| 7,472,290 B2 * | 12/2008 | Diab et al. | .................... | 713/300 |
| 7,472,296 B2 * | 12/2008 | Kato et al. | ..................... | 713/320 |
| 7,504,948 B2 * | 3/2009 | Wulff et al. | ................. | 340/572.1 |
| 7,522,050 B2 * | 4/2009 | Le | .............................. | 340/572.1 |
| 7,539,882 B2 * | 5/2009 | Jessup et al. | .................. | 713/300 |
| 7,627,696 B2 * | 12/2009 | Suematsu et al. | ............... | 710/14 |
| 2006/0100799 A1 * | 5/2006 | Karam | ........................... | 702/57 |
| 2006/0238302 A1 * | 10/2006 | Loving et al. | ................ | 340/10.1 |
| 2007/0001816 A1 * | 1/2007 | Lindley et al. | ............. | 340/10.34 |
| 2008/0061937 A1 * | 3/2008 | Park | ............................. | 340/10.1 |

* cited by examiner

*Primary Examiner* — Daniel Wu
*Assistant Examiner* — Rufus Point
(74) *Attorney, Agent, or Firm* — Peter Priest

(57) ABSTRACT

A radio frequency identification (RFID) tag reader. The tag reader includes a power detection circuit operable to detect power from a plurality of different power sources, and a controller for operating the radio frequency identification tag reader at a power consumption level commensurate with a detected power source.

48 Claims, 2 Drawing Sheets

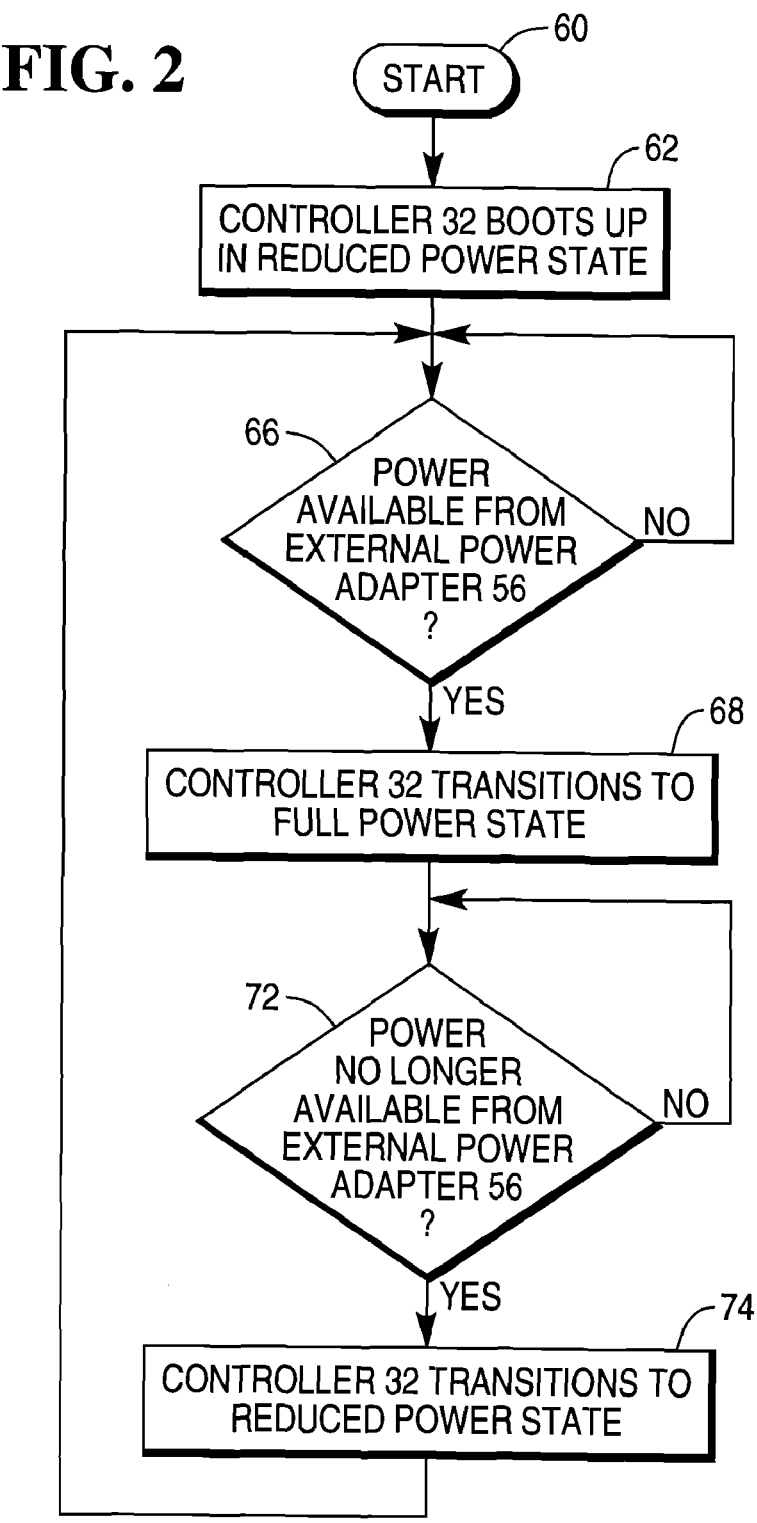

RFID TAG READER

BACKGROUND OF THE INVENTION

It would be desirable to provide a radio frequency identification (RFID) tag reader capable of receiving power from a plurality of different power sources.

SUMMARY OF THE INVENTION

A radio frequency identification (RFID) tag reader is disclosed.

BRIEF DESCRIPTION OF THE DRAWINGS

FIG. 2. is a flow chart illustrating an example mode of operation of the RFID tag reader.

DETAILED DESCRIPTION

Figure 1:
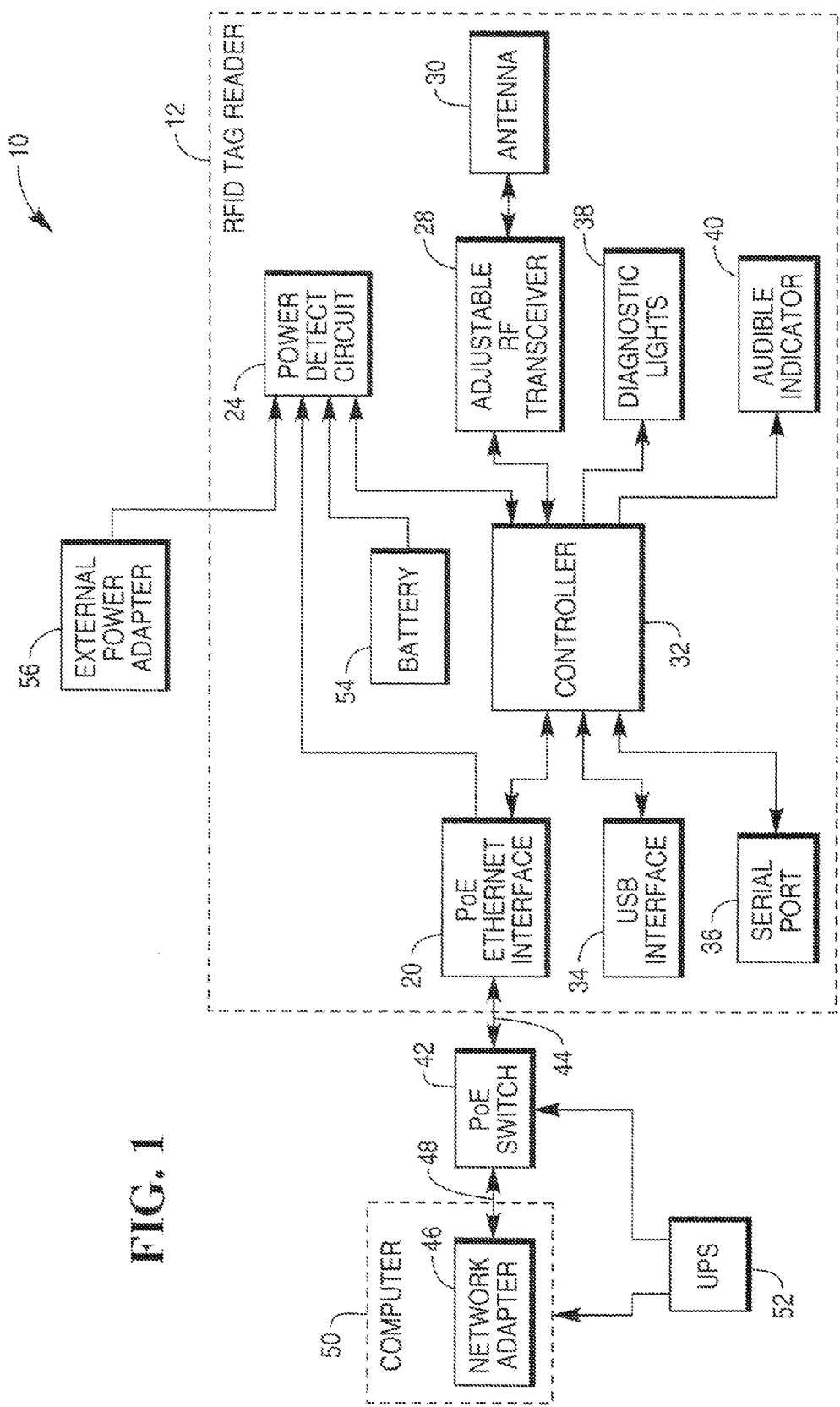
FIG. 1 is a block diagram of a system including an RFID tag reader.

With reference to FIG. 1, an example embodiment of a radio frequency identification (RFID) tag reading system 10 includes RFID reader 12.

RFID reader 12 obtains power from a plurality of different power sources. One such power source includes Power over Ethernet (PoE). The current PoE standard (IEEE 802.3af) allows up to thirteen watts of power to be delivered to an end device. Use of PoE as a data communication and power source simplifies wiring, facilitates easier remote hard resets during servicing, and facilitates the use of a centralized uninterruptible power supply (UPS) 52.

Other power sources may includes local power sources, such as battery 54, or standard line voltage via external power adapter 56.

Example RFID reader 12 includes PoE Ethernet interface 20, power detect circuit 24, adjustable RF transceiver 28, antenna 30, and controller 32.

PoE Ethernet interface 20 couples RFID reader 12 to a network. For example, PoE Ethernet interface 20 may be coupled to a PoE capable network switch 42 via a network cable 44. Network switch 42 may be coupled to a network adapter 46 in computer 50 via network cable 48. While coupled to the network, RFID reader 12 not only receives power, but also transfers RFID tag data to computer 50 and receives instructions from computer 50. Power to the PoE capable network switch 42 may be supplied by standard line voltage, from an uninterruptible power supply 52, or both.

Power detect circuit 24 detects whether the RFID reader 12 is receiving power from the network via PoE Ethernet interface 20, from a local power such as battery 54, or from a standard line voltage via external power adapter 56.

Adjustable RF transceiver 28 transmits a signal for interrogating an RFID tag through antenna 30 and receives a response signal from the RFID tag through antenna 30. The power of the transmitted signal is dictated to adjustable RF transceiver 28 by controller 32, depending on how RFID tag reader 12 is receiving power.

Controller 32 controls operation of RFID tag reader 12. In an example mode of operation, controller 32 determines whether RFID tag reader 12 operates in a Full Power State or a Reduced Power State, as defined below.

RFID reader 12 may further include USB interface 34, serial port 36, diagnostic lights 38, and audible indicator 40.

USB interface 34 provides the option of coupling RFID tag reader 12 to a USB port of a computer, such as computer 50.

Serial port 36 provides another option for coupling RFID tag reader 12 to a computer, and may include an RS-232 serial port.

Diagnostic lights 38 and audible indicator 40 provide visual and aural indications to a user of RFID tag reader 12 during operation.

Example RFID reader 12 operates in either of two power states:

1. Full Power State—RFID tag reader 12 operates with a normal transmission range, tag detection capability, and data transfer rate. When on, diagnostic lights 38 are full bright, and audible indicator 40 is full volume.

2. Reduced Power State—RFID tag reader 12 operates with a diminished transmission range, tag detection capability, and data transfer rate. When on, diagnostic lights 38 are dim and audible indicator 40 is reduced in volume.

Controller 32 may boot up in the second Reduced Power State, assuming the only available source of power is PoE from PoE Ethernet interface 20 or from battery 54. In this second Reduced Power State, controller 32 decreases RF power from adjustable RF transceiver 28. Controller 32 may implement further power saving measures while operating in this state, including reducing processor speed, reducing the duty cycle of adjustable RF transceiver 28, disabling or dimming operation of diagnostic lights 38, disabling or reducing operation of audible indicators 40, and disabling unused interfaces, such as USB interface 34 and serial port 36.

After booting up, controller 32 determines from power detect circuit 24 the available sources of power. If power is available from external power adapter 56, the controller 32 transitions RFID reader 12 to the first Full Power State. In this first Full Power State, controller 32 increases RF power from adjustable RF transceiver 28. Controller 32 may further increase processor speed, increase the duty cycle of adjustable RF transceiver 28, enable full brightness operation of diagnostic lights 38, enable full operation of audible indicators 40, and enable all interfaces, such as USB interface 34 and serial port 36.

If controller 32 transitions RFID tag reader 12 to the first Full Power State and then later detects from power detect circuit 24 that external power adapter 56 is no longer providing power, controller 32 responds in a reverse fashion by transitioning RFID tag reader 12 back to the second Reduced Power State.

Turning now to FIG. 2, an example mode of operation is illustrated beginning with START 60.

In step 62, controller 32 boots up in the default second Reduced power State.

In step 66, controller 32 waits for a signal from power detect circuit 24. If controller 32 determines that power is available from external power adapter 56, operation proceeds to step 68. Otherwise, operation returns to step 66.

In step 68, controller 32 transitions RFID reader 12 to the first Full Power State.

In step 72, controller 32 monitors for loss of power from external power adapter 56. If power is no longer available from external power adapter 56, operation proceeds to step 74. Otherwise, operation returns to step 72.

In step 74, controller 32 transitions RFID tag reader 12 to the second Reduced Power State and then returns to step 66.

Although particular reference has been made to certain embodiments, variations and modifications are also envisioned within the spirit and scope of the following claims.

What is claimed is:

1. A radio frequency identification tag reader comprising:
a power detection circuit operable to detect power from a plurality of different power sources;

a controller for adjusting an adjustable radio frequency transceiver to transmit at a power level commensurate with a detected power source when reading an RFID tag.

2. The radio frequency identification tag reader of claim 1, further comprising an antenna for transmitting a signal for interrogating a radio frequently identification tag, wherein the power detection circuit detects a change from the detected power source to another of the plurality of different power sources, and the controller adjusts the power of the adjustable radio frequency transceiver thereby adjusting a transmission range for the radio frequency identification reader.

3. The radio frequency identification tag reader of claim 1, wherein a detected power source comprises a battery within the radio frequency identification tag reader.

4. The radio frequency identification tag reader of claim 1, further comprising:
   a power over Ethernet interface circuit for connecting to a power over Ethernet network;
   wherein a detected power source comprises a power over Ethernet network power source.

5. The radio frequency identification tag reader of claim 1, wherein a detected power source produces a first power level less than a second power level of an external power adapter, and wherein the controller operates the adjustable radio frequency transceiver at a first power consumption level less than a second power consumption level associated with using the external power adapter.

6. The radio frequency identification tag reader of claim 5, wherein the controller operates at a first processor speed less than a second processor speed associated with using the external power adapter.

7. The radio frequency identification tag reader Of claim 5, wherein the controller operates the adjustable radio frequency transceiver at a first duty cycle less than a second duty cycle associated with using the external power adapter.

8. The radio frequency identification tag reader of claim 5, wherein the controller operates the adjustable radio frequency transceiver at a first radio frequency output power level less than a second radio frequency output power level associated with using the external power adapter.

9. The radio frequency identification tag reader of claim 5, further comprising a diagnostic light, wherein the controller operates the diagnostic light at a first brightness level less than a second brightness level associated with using the external power adapter.

10. The radio frequency identification tag reader of claim 5, further comprising an audible indicator, wherein the controller operates the audible indicator at a first volume level less than a second volume level associated with using the external power adapter.

11. The radio frequency identification tag reader of claim 5, further comprising a serial interface, wherein the controller disables the serial interface while the radio frequency identification tag reader is powered by the detected power source.

12. The radio frequency identification tag reader of claim 2, wherein a detected power source comprises a power adapter external to the radio frequency identification reader, and the controller operates the adjustable radio frequency transceiver at a first power consumption level higher than a second power consumption level associated with a second power source.

13. The radio frequency identification tag reader of claim 12, wherein the controller operates at a first processor speed greater than a second processor speed associated with using the second power source.

14. The radio frequency identification tag reader of claim 12, wherein the controller operates the adjustable radio frequency transceiver at a first duty cycle greater than a second duty cycle associated with using the second power source.

15. The radio frequency identification tag reader of claim 12, wherein the controller operates the adjustable radio frequency transceiver at a first radio frequency output power level greater than a second radio frequency output power level associated with using the second power source.

16. The radio frequency identification tag reader of claim 12, further comprising a diagnostic light, wherein the controller operates the diagnostic light at a first brightness level greater than a second brightness level associated with using the second power source.

17. The radio frequency identification tag reader of claim 12, further comprising an audible indicator, wherein the controller operates the audible indicator at a first volume level greater than a second volume level associated with using the second power source.

18. The radio frequency identification tag reader of claim 12, further comprising a serial interface, wherein the controller enables the serial interface while the radio frequency identification tag reader is powered by an external power adapter.

19. The radio frequency identification tag reader of claim 12, wherein the second power source comprises a battery.

20. The radio frequency identification tag reader of claim 12, further comprising a power over Ethernet interface circuit for connecting to a power over Ethernet network, wherein the second power source comprises a power over Ethernet power source.

21. The radio frequency identification tag reader of claim 2, wherein a detected power source comprises a power adapter external to the radio frequency identification tag reader, and the controller begins operating the adjustable radio frequency transceiver at a first power consumption level higher than a second power consumption level associated with a second power source.

22. The radio frequency identification tag reader of claim 21, wherein the controller receives a signal from the power detection circuit indicating removal of the power adapter, and wherein the controller operates the adjustable radio frequency transceiver at a third power consumption level commensurate with a third power level received from a third power source by the controller.

23. The radio frequency identification tag reader of claim 21, wherein the second power source comprises a battery.

24. The radio frequency identification tag reader of claim 21, further comprising a power over Ethernet interface circuit for connecting to a power over Ethernet network, wherein the second power source comprises a power over Ethernet power source.

25. A method of operating a radio frequency identification tag reader comprising:
   detecting power from a number of different power sources;
   producing corresponding signals indicative of the different power sources; and
adjusting an adjustable radio frequency transceiver to transmit at a power level commensurate with a power level received from a single power source by the controller when reading an RFID tag.

26. The method of claim 25, wherein the single power source comprises a power adapter external to the radio frequency identification tag reader.

27. The method of claim 25, wherein the single power source comprises a battery of the radio frequency identification tag reader.

28. The method of claim 25, wherein the single power source comprises a power over Ethernet power source.

29. The method of claim 25, wherein the operating step includes the adjustable radio frequency transceiver using the single power source at a first power consumption level less than a second power consumption level associated with using an external power adapter.

30. The method of claim 29, wherein the operating step further comprises operating the controller at a first processor speed less than a second processor speed associated with using the external power adapter.

31. The method of claim 29, wherein the operating step further comprises operating the adjustable radio frequency transceiver at a first duty cycle less than a second duty cycle associated with using the external power adapter.

32. The method of claim 29, wherein the operating step further comprises operating the adjustable radio frequency transceiver at a first radio frequency output power level less than a second radio frequency output power level associated with using the external power adapter.

33. The method of claim 29, wherein the operating step further comprises operating a diagnostic light of the radio frequency identification tag reader at a first brightness level less than a second brightness level associated with using the external power adapter.

34. The method of claim 29, wherein the operating step further comprises operating an audible indicator of the radio frequency identification tag reader at a first volume level less than a second volume level associated with using the external power adapter.

35. The method of claim 29, wherein the operating step further comprises disabling a serial interface of the radio frequency identification tag reader.

36. The method of claim 26, wherein the operating step comprises operating the adjustable radio frequency transceiver at a first power consumption level higher than a second power consumption level associated with a second power source.

37. The method of claim 36, wherein the operating step further comprises operating the controller at a first processor speed greater than a second processor speed associated with using the second power source.

38. The method of claim 36, wherein the operating step further comprises operating the adjustable radio frequency transceiver at a first duty cycle greater than a second duty cycle associated with using the second power source.

39. The method of claim 36, wherein the operating step further comprises operating the adjustable radio frequency transceiver at a first radio frequency output power level greater than a second radio frequency output power-level associated with using the second power source.

40. The method of claim 36, wherein the operating step further comprises operating a diagnostic light of the radio frequency identification tag reader at a first brightness level greater than a second brightness level associated with using the second power source.

41. The method of claim 36, wherein the operating step further comprises operating an audible indicator of the radio frequency identification tag reader at a first volume level greater than a second volume level associated with using the external power adapter.

42. The method of claim 36, wherein the operating step further comprises enabling a serial interface of the radio frequency identification tag reader.

43. The method of claim 36, wherein the second power source comprises a battery of the radio frequency identification tag reader.

44. The method of claim 36, wherein the second power source comprises a power over Ethernet power source.

45. The method of claim 25, further comprising:
booting up from a default power source prior to the detecting step by the controller.

46. The method of claim 45, wherein the default power source comprises a battery.

47. The method of claim 45, wherein the default power source comprises a power over Ethernet power source.

48. The method of claim 26, further comprising:
receiving another signal by the controller indicating removal of the power adapter; and
operating the adjustable radio frequency transceiver at a second power consumption level commensurate with a second power level received from a second power source by the controller.

* * * * *